UNITED STATES PATENT OFFICE

DANIEL ZINNER, OF SOUTH MILWAUKEE, WISCONSIN, ASSIGNOR, BY MESNE ASSIGNMENTS TO E. I. DU PONT DE NEMOURS & COMPANY, A CORPORATION OF DELAWARE

BROWN AZO DYESTUFFS

No Drawing.  Application filed February 24, 1931.  Serial No. 518,029.

This invention relates to azo dyestuffs.

It is an object of this invention to produce yellowish-brown to reddish-brown dyestuffs for cotton of great brightness, of good fastness to light and to washing, and of good exhausting qualities.

Although brown azo dyestuffs are known and have been produced, none of these, to the best of my knowledge and experience, are characterized by a satisfactory degree of brightness or have good fastness and exhausting qualities. Accordingly, there exists today an earnest commercial demand for bright brown dyestuffs of good fastness and exhausting qualities, and of reasonably low cost.

I have now found that the urea-type, tetrakisazo dyestuffs having in the form of their free acids the following general formula:

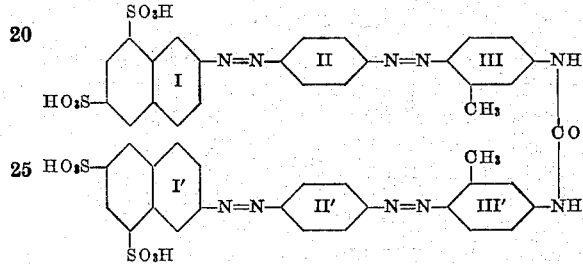

in which the phenylene residues II and II' may be free or substituted by like or different monovalent substituents other than sulfonic acid groups, for instance alkyl or alkoxy groups, possess the above mentioned desired characteristics to a remarkable degree. In other words, dyestuffs represented by this generic formula produce upon cotton, from either a neutral or alkaline bath, yellowish brown to reddish brown shades of good brightness and of excellent fastness to light and to washing.

I am aware that urea-type tetrakisazo dyestuffs in general are known and have been described, for example, in U. S. Patent No. 978,580. Although U. S. Patent No. 978,580 indicates that some of the combinations disclosed would yield brown shades, it was not to be foreseen that the particular combination herein disclosed and claimed would give shades of a brightness heretofore not generally found in connection with brown colors.

In fact, many of the combinations coming within the broad disclosure of U. S. Patent 978,580 give shades which if brown at all are dull and of little commercial value.

My preferred method of preparing my new dyestuffs comprises diazotizing 2-naphthylamine-6, 8-disulfonic acid, coupling the diazo body thus formed to aniline or a substitution derivative of aniline having a free position para to the amino group and containing no sulfonic acid groups, rediazotizing the amino azo body and coupling the diazo body last formed to meta-toluidine, and finally condensing the resulting amino-disazo dyestuff according to well known procedure with phosgene to produce a urea-type tetrakisazo dyestuff.

The intermediate amino-disazo dyestuffs above obtained possess in the form of their free acids the following general formula:

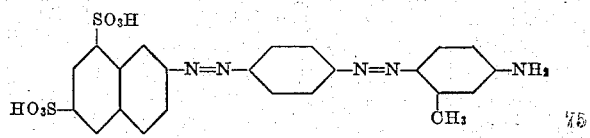

wherein the middle component may carry other substituents for instance alkyl or alkoxy, but no sulfonic acid groups.

In condensing with phosgene, I may use either an amino disazo dyestuff of the above general formula by itself, in which case the resulting condensation product is uniformly composed of a symmetrical urea of the type

or I may use a substantially equimolecular mixture of two amino-disazo compounds of the above general formula, in which case the resulting dyestuff contains to a large extent an unsymmetrical urea of the type

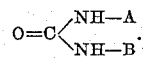

If unsubstituted aniline is selected as the middle component in the above general formula, the resulting condensation product dyes cotton in yellowish brown shades. If cresidine is selected, the shade is reddish brown. If less heavily substituted intermediates are selected, for instance those containing m-toluidine, p-xylidine, or o-anisidine as the second component, intermediate brown shades may be produced. Similar intermediate brown shades may also be produced if a mixture of any two of the above defined intermediates is selected. In all cases, the brightness of the shade, its exhausting qualities, and it good fastness to light and to washing are remarkable.

My novel dyestuffs are isolated in the form of an alkali metal salt, generally the sodium salt; and may be used to dye cotton directly from either a neutral or an alkaline bath.

The following specific examples will serve further to illustrate my invention. But it is to be understood that my invention is not limited to the precise details indicated below. The parts given are by weight.

*Example 1*

303 parts of 2-amino-naphthalene-6, 8-disulfonic acid are dissolved in 3000 parts of water and the mixture is made slightly alkaline with soda ash. 464 parts of hydrochloric acid (20° Bé.) and 69 parts of sodium nitrite are now added and diazotization is completed at a temperature of 0 to 5° C.

To this diazo mixture 400 parts of sodium acetate (crystals) are added together with 209 parts of methyl-aniline-omega-sulfonic acid. The coupling is finished in 5 to 10 hours and the resulting mass is made strongly alkaline with caustic soda or any suitable alkaline hydrolyzing agent, boiled, salted out (20° Bé.) and filtered. The paste of the resulting amino-azo compound is dissolved in 3000 parts of water, made acid with 320 parts of hydrochloric acid (20° Bé.) and diazotized with 49 parts of nitrite of soda at a temperature of 10° C. 85 parts of meta-toluidine dissolved in 1000 parts of water and 90 parts of hydrochloric acid (20° Bé.) are now added to this diazo mixture and the mineral acid neutralized by the addition of 300 parts of sodium acetate (crystals). The coupling is complete in about 20 hours. The mixture is now rendered acid with hydrochloric acid and filtered.

The resulting amino-disazo dye paste is now dissolved in 3000 parts of water and rendered alkaline, preferably with soda ash. The solution is heated to 70° C. and phosgene gas is forced into the solution until condensation of the amino disazo compound with phosgene is complete. The completeness of this reaction can be determined by testing samples of the mixture for free amine. The solution during the condensation must be kept continuously neutral or alkaline by the addition of soda ash.

When the condensation is complete, the dyestuff which has crystallized out of solution is filtered and dried.

The dyestuff when in the dry state is a yellowish brown powder which dissolves in water with a yellowish brown color, unchanged by the addition of alkali, but assuming a bluish color by the addition of mineral acid. It dyes cotton from a neutral or alkaline bath a very bright yellowish-brown shade, exceptionally fast to light and to washing.

Upon reduction with stannous chloride or hydrosulfite of sodium, the dyestuff yields 2-amino-naphthalene-6. 8-sulfonic acid, p-phenylene-diamine, and 4, 4'-diamino-3, 3'-dimethyl-diphenyl urea.

*Example 2*

The procedure is the same as in Example 1, except that the 209 parts of methylaniline-omega-sulfonic acid used in that example are replaced by 239 parts of ortho-methoxy-methylaniline-omega-sulfonic acid.

The resulting dyestuff in the dry state is a reddish brown colored powder which dissolves in water with a reddish brown color unchanged by additions of alkali, but changing to a blue color by the addition of mineral acid. It dyes cotton from a neutral or alkaline bath a bright reddish brown shade which is exceptionally fast to light and to washing.

If the dye is reduced with stannous chloride or with hydrosulfite of sodium, it yields 2-amino-naphthalene-6, 8-disulfonic acid methoxy-p-phenylene-diamine, and 4, 4'-diamino-3, 3'-dimethyl-diphenyl urea.

*Example 3*

263 parts of the amino-disazo base obtained in Example 1 and 278 parts of the amino-disazo base obtained in Example 2 are dissolved in 4000 parts of water which has been rendered alkaline with soda ash. The solution is heated to 70° C. Phosgene gas is then passed into the solution until the condensation of the amino-disazo bases and the phosgene is complete. The solution must continuously be kept neutral or alkaline with soda ash.

After the condensation is complete, the dye is filtered off and dried. The dyestuff in the dry state is an orange brown powder which dissolves in water with a similar color remaining unchanged by the addition of alkali but changing to blue by the addition of acid. It dyes cotton from a neutral or alkaline bath bright brown shades remarkably fast to light and to washing.

Upon reduction with stannous chloride or hydrosulfite of sodium, the dyestuff yields 2-amino-naphthalene-6, 8-disulfonic acid, p-phenylene-diamine, methoxy-p-phenylene-diamine and 4, 4'-diamino-3, 3'-dimethyl-diphenyl urea.

As stated above, other middle components may be used in preparing the amino-disazo compounds. It will be understood of course that where a more active middle component than aniline is selected, for instance, m-toluidine or cresidine, the same may be coupled directly in basic form; that is, without previous conversion into the omega-methyl-sulfonic acid derivative.

Although the primary utility of my novel brown dyestuffs is in dyeing cotton, it will be understood that they are adapted also for dyeing other materials, for instance wool, silk and rayon.

In the claims below, it should be understood that where new products, dyestuffs, or articles of manufacture are claimed, I mean to include these bodies not only in substance but also in whatever state they may exist when applied to material dyed, printed or pigmented therewith.

I am aware that numerous details of the process may be varied through a wide range without departing from the principles of this invention, and I, therefore, do not purpose limiting the patent granted hereon otherwise than necessitated by the prior art.

I claim as my invention:

1. As a new product of manufacture, a tetrakisazo dyestuff having in the form of its free acid the following probable general formula:

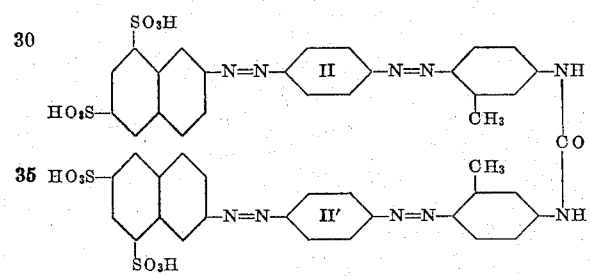

in which the phenylene residues II and II' are free or substituted by like or different substituents of the group consisting of alkyl and alkoxy groups, said dyestuff being characterized by dyeing cotton from a neutral or alkaline bath in yellowish brown to reddish brown shades of great brightness and of good fastness to light and to washing.

2. As a new product of manufacture a tetrakisazo dyestuff having in the form of its free acid the following probable general formula:

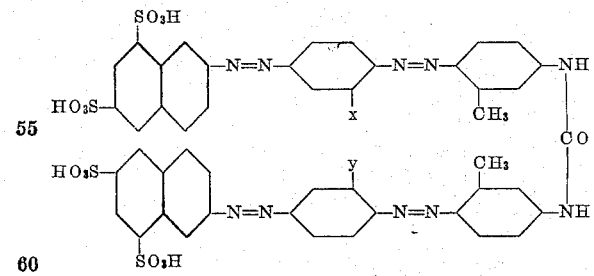

in which $x$ and $y$ individually stand for either H or the $OCH_3$ group, said dyestuff being characterized by dyeing cotton from a neutral or alkaline bath in yellowish brown to reddish brown shades of great brightness and of good fastness to light and to washing.

3. As a new product of manufacture a tetrakisazo dyestuff having in the form of its free acid the following probable formula:

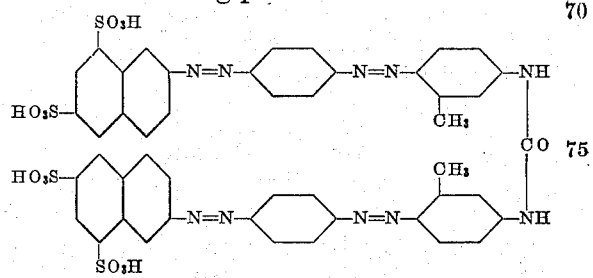

said dyestuff being characterized by dyeing cotton from a neutral or alkaline bath a yellowish brown shade of excellent brightness and good fastness to light and to washing.

4. As a new product of manufacture a tetrakisazo dyestuff having in the form of its free acid the following probable formula:

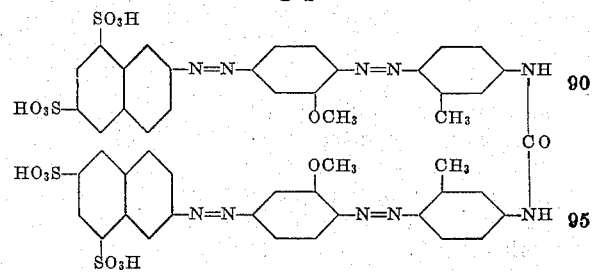

said dyestuff being characterized by dyeing cotton from a neutral or alkaline bath a reddish brown shade of excellent brightness and good fastness to light and to washing.

5. As a new product of manufacture a tetrakisazo dyestuff having in the form of its free acid the following probable formula:

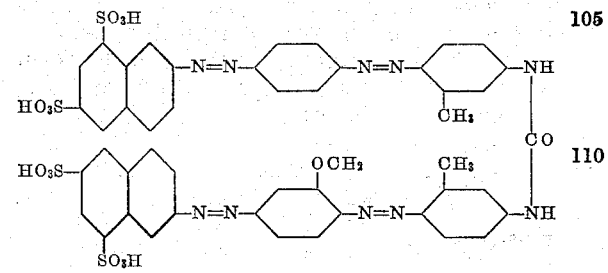

said dyestuff being characterized by dyeing cotton from a neutral or alkaline bath an orange-brown shade of excellent brightness and good fastness to light and to washing.

6. The process of preparing a bright brown azo dyestuff, which comprises reacting with phosgene upon an amino-disazo compound which in the form of its free acid has the following probable general formula:

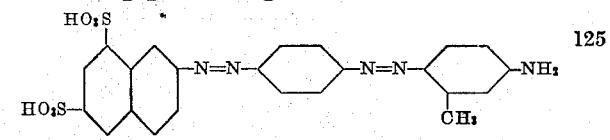

in which the middle phenylene nucleus is free or substituted by substituents of the group consisting of alkyl and alkoxy, and recovering the product.

7. The process of preparing a bright brown azo dyestuff, which comprises reacting with phosgene upon an amino-disazo compound which in the form of its free acid has the following probable general formula:

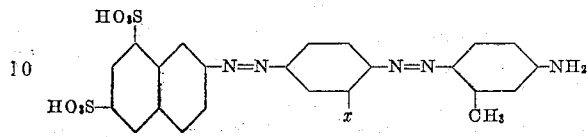

in which $x$ stands for H or $OCH_3$, and recovering the product.

8. The process of preparing a bright brown azo dyestuff, which comprises reacting with phosgene upon an amino-disazo compound which in the form of its free acid has the following probable formula:

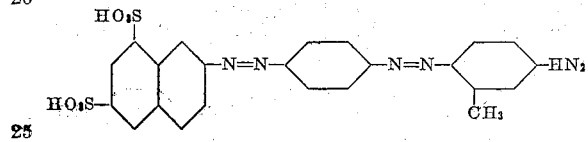

and recovering the product.

9. The process of preparing a bright brown azo dyestuff, which comprises reacting with phosgene upon an amino-disazo compound which in the form of its free acid has the following probable formula:

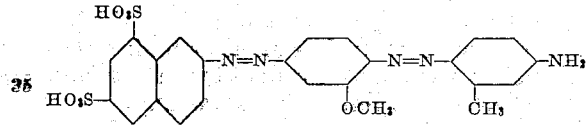

and recovering the product.

10. The process of preparing a bright brown azo dyestuff, which comprises reacting with phosgene upon a mixture of two amino-disazo compounds having in the form of their free acid the following probable respective formulas:

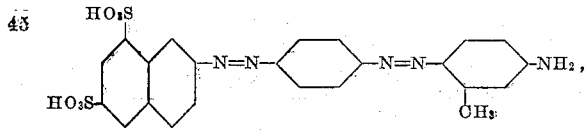

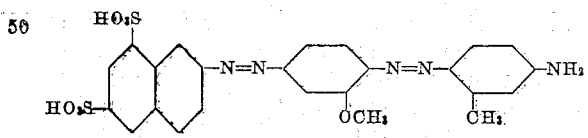

and recovering the product.

In testimony whereof I have hereunto subscribed my name at Carrollville, Milwaukee County, Wisconsin.

DANIEL ZINNER.